(12) United States Patent
Boyd

(10) Patent No.: US 10,952,426 B1
(45) Date of Patent: Mar. 23, 2021

(54) ANIMAL REPELLENT CANISTER

(71) Applicant: Fred Boyd, Columbus, MS (US)

(72) Inventor: Fred Boyd, Columbus, MS (US)

( * ) Notice: Subject to any disclaimer, the term of this patent is extended or adjusted under 35 U.S.C. 154(b) by 91 days.

(21) Appl. No.: 16/056,618

(22) Filed: Aug. 7, 2018

(51) Int. Cl.
*A01M 29/12* (2011.01)

(52) U.S. Cl.
CPC .................. *A01M 29/12* (2013.01)

(58) Field of Classification Search
CPC .............. A01M 29/12; A01M 1/2005
USPC ............ 239/276, 34–60, 273, 275, 279–281, 239/57–60
See application file for complete search history.

(56) References Cited

U.S. PATENT DOCUMENTS

| | | | |
|---|---|---|---|
| 1,329,559 A * | 2/1920 | Tesla .................. | F15C 1/00 138/37 |
| 1,577,351 A * | 3/1926 | Alvarez ............. | B65D 81/28 43/131 |
| 1,729,389 A | 9/1929 | Hubel | |
| 2,837,861 A | 6/1958 | Graham | |
| 3,867,526 A * | 2/1975 | Hennart ............. | A01N 25/22 514/136 |
| D329,270 S | 9/1992 | Der-Jinn | |
| 5,379,545 A | 1/1995 | Gall | |
| 5,729,928 A * | 3/1998 | Anderson ........... | A01K 97/02 239/56 |
| 5,873,193 A | 2/1999 | Jensen | |
| 7,325,358 B1 | 2/2008 | Chalupsky | |
| 7,806,286 B2 | 10/2010 | Berge | |
| 8,490,889 B2 * | 7/2013 | Rydbom ............ | A61L 9/12 239/34 |
| 9,402,383 B2 | 8/2016 | Kresic | |
| 9,949,449 B2 * | 4/2018 | Ryan ................. | A01G 25/14 |
| 2010/0086448 A1 * | 4/2010 | Faber ................ | A47G 7/06 422/120 |
| 2014/0001186 A1 * | 1/2014 | Boyd ................. | B65D 51/16 220/367.1 |
| 2014/0007489 A1 * | 1/2014 | Bonacic Kresic .... | A01M 1/103 43/121 |

FOREIGN PATENT DOCUMENTS

CA          2538581         6/2013

* cited by examiner

*Primary Examiner* — Christopher S Kim

(57) ABSTRACT

The animal repellent canister is a chemical dispenser. The animal repellent canister is configured for use in driving away nuisance animals (hereinafter pests). The animal repellent canister stores and dispenses a repellent material known to repel pests. The animal repellent canister dispenses the repellent material in a gas phase. The animal repellent canister contains the repellent material in a water impermeable structure such that precipitation will not wash away the repellent material. The animal repellent canister comprises a dispenser, a ground anchor, and the repellent material. The dispenser contains the repellent material in a phase selected from the group consisting of a liquid phase and a solid phase. The dispenser releases the repellent material in a gas phase. The ground anchor anchors the dispenser to the ground such that the dispenser is elevated above the ground.

1 Claim, 4 Drawing Sheets

ANIMAL REPELLENT CANISTER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of containers for materials, more specifically, an olfactory signaling device (B65D2203/12).

SUMMARY OF INVENTION

The animal repellent canister is a chemical dispenser. The animal repellent canister is configured for use in driving away nuisance animals (hereinafter pests). The animal repellent canister stores and dispenses a repellent material known to repel pests. The animal repellent canister dispenses the repellent material in a gas phase. The animal repellent canister contains the repellent material in a water impermeable structure such that precipitation will not wash away the repellent material. The animal repellent canister comprises a dispenser, a ground anchor, and the repellent material. The dispenser contains the repellent material in a phase selected from the group consisting of a liquid phase and a solid phase. The dispenser releases the repellent material in a gas phase. The ground anchor anchors the dispenser to the ground such that the dispenser is elevated above the ground.

These together with additional objects, features and advantages of the animal repellent canister will be readily apparent to those of ordinary skill in the art upon reading the following detailed description of the presently preferred, but nonetheless illustrative, embodiments when taken in conjunction with the accompanying drawings.

In this respect, before explaining the current embodiments of the animal repellent canister in detail, it is to be understood that the animal repellent canister is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the animal repellent canister.

It is therefore important that the claims be regarded as including such equivalent construction insofar as they do not depart from the spirit and scope of the animal repellent canister. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
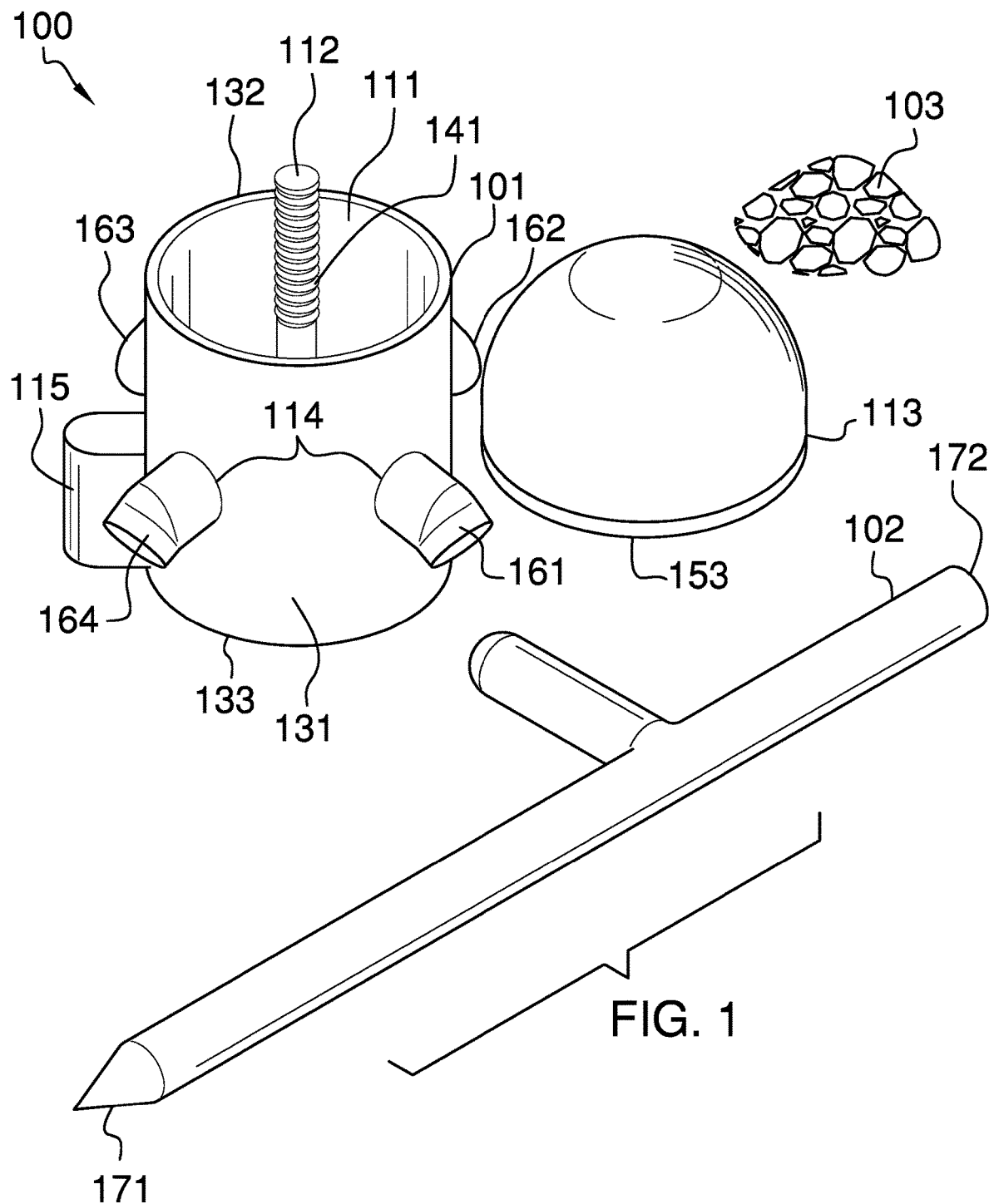
FIG. 1 is a perspective view of an embodiment of the disclosure.
Figure 2:
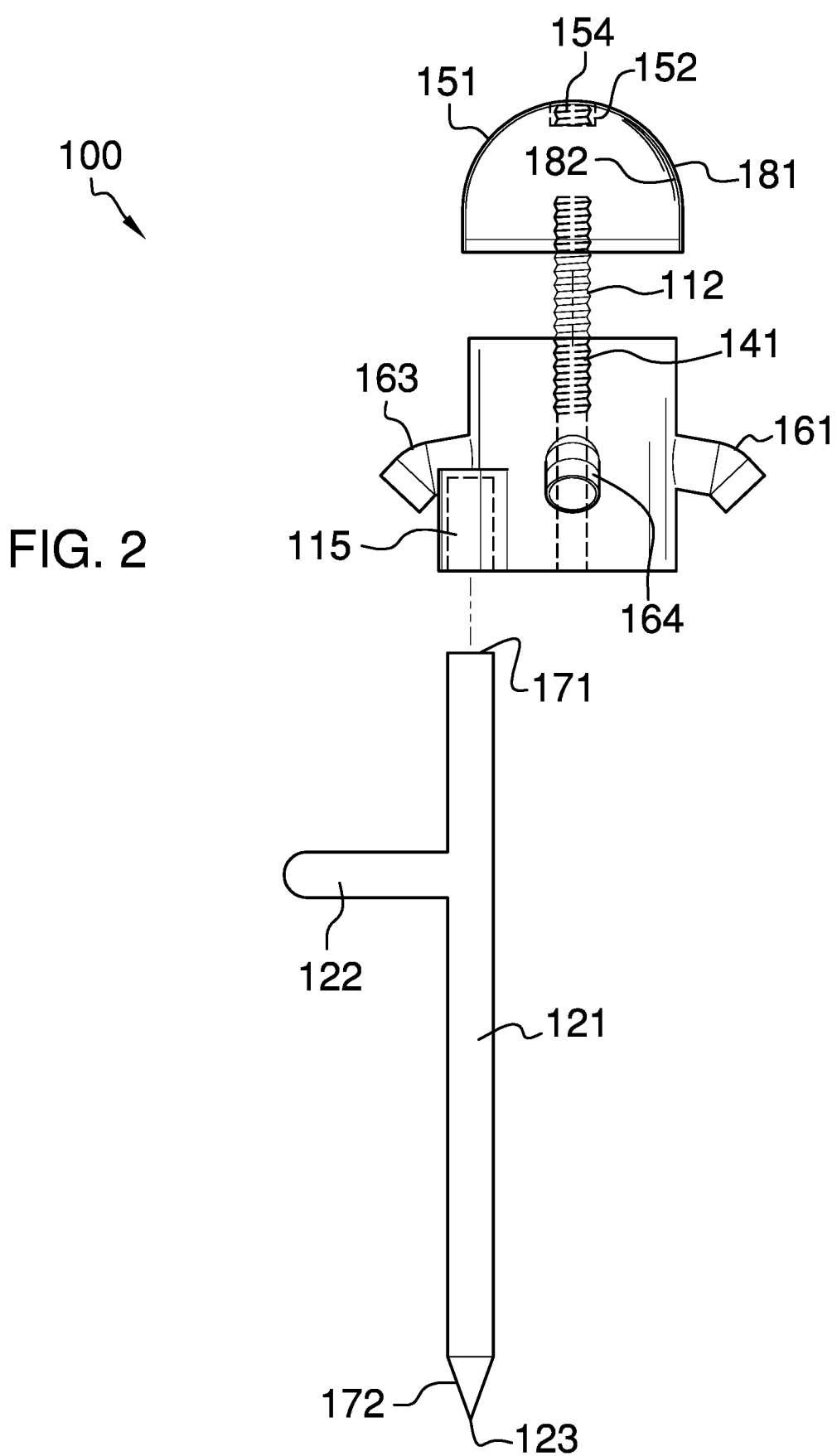
FIG. 2 is an exploded view of an embodiment of the disclosure.
Figure 3:
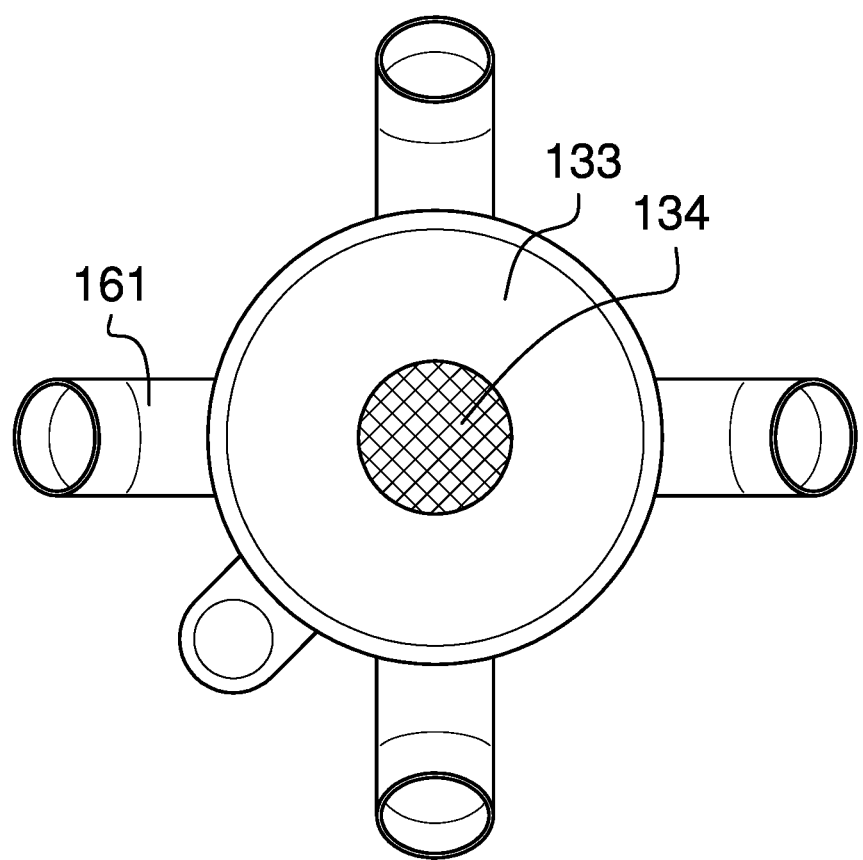
FIG. 3 is a bottom view of an embodiment of the disclosure.
Figure 4:
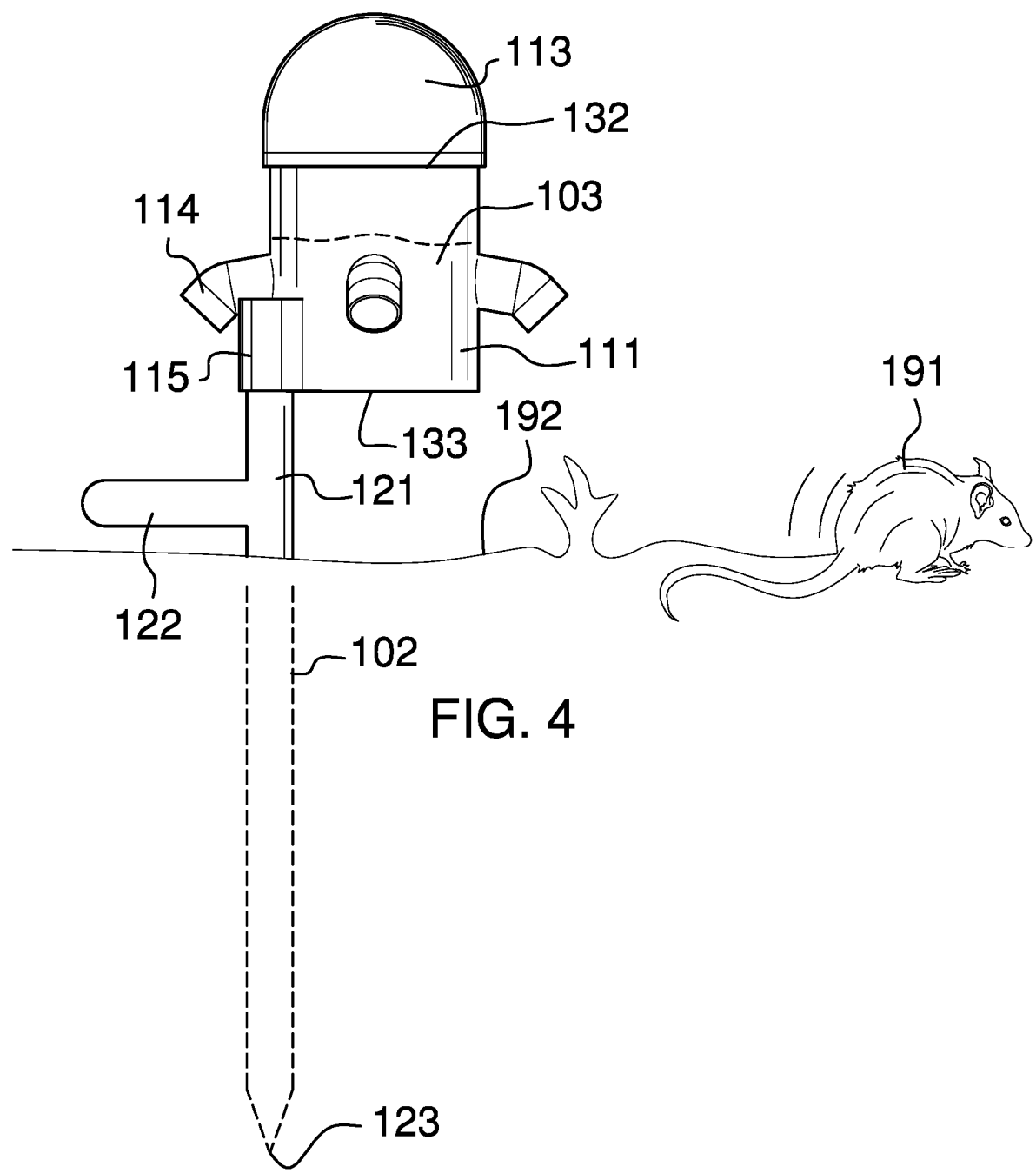
FIG. 4 is an in-use view of an embodiment of the disclosure.

Detailed reference will now be made to one or more potential embodiments of the disclosure, which are illustrated in FIGS. 1 through 4.

The animal repellent canister 100 (hereinafter invention) is a chemical dispenser 101. The invention 100 is configured for use in driving away nuisance animals 191 (hereinafter pest). The pest 191 refers to an animal that is in an undesired location. The invention 100 stores and dispenses a repellent material 103 known to repel a pest 191. The invention 100 dispenses the repellent material 103 in a gas phase. The invention 100 contains the repellent material 103 in a water impermeable structure such that precipitation will not wash away the repellent material 103. The invention 100 comprises a dispenser 101, a ground 192 anchor 102, and the repellent material 103. The dispenser 101 contains the repellent material 103 in a phase selected from the group consisting of a liquid phase and a solid phase. The dispenser 101 releases the repellent material 103 in a gas phase. The ground 192 anchor 102 anchors the dispenser 101 to the ground 192 such that the dispenser 101 is elevated above the ground 192.

The dispenser 101 is a fluid impermeable containment structure. The dispenser 101 stores the repellent material 103 while the repellent material 103 is in a solid and liquid phase. The dispenser 101 releases the repellent material 103 in a gas phase into the atmosphere. The dispenser 101 comprises a canister 111, a center shaft 112, a cap 113, a plurality of exhaust vents 114, and an anchor mount 115.

The canister 111 is a fluid impermeable container. The canister 111 has a cylindrical shape. The canister 111 is formed in the manner of a capped pipe. The canister 111 forms the physical shell that contains the repellent material 103 in the solid and liquid states. The canister 111 further comprises a canister 111 lateral face 131, a canister 111 superior end 132, and a canister 111 inferior end 133. The canister 111 inferior end 133 further comprises a make-up vent 134.

The canister 111 lateral face 131 is the lateral face of the cylindrical structure formed by the canister 111. The canister 111 superior end 132 is the open end of the capped pipe structure of the canister 111. Access into the hollow interior of the canister 111 is through the canister 111 superior end 132. The canister 111 inferior end 133 is the closed end of the canister 111. The canister 111 inferior end 133 forms the inferior surface of the canister 111 after the canister 111 is mounted on the ground 192 anchor 102.

The make-up vent 134 is a Tesla valve that is formed in the canister 111 inferior end 133. The make-up vent 134 is a check valve that: a) allows make up air to enter the canister 111 to replace the gas vapor of the repellent material 103 lost through the plurality of exhaust vents 114; while, b) preventing any repellent material 103 that is in a liquid phase from escaping from the canister 111. The make-up vent 134 is mounted in the canister 111 inferior end 133 such that precipitation, such as rain, cannot enter the canister 111 through the make-up vent 134.

The center shaft 112 is a cylindrical shaft structure known as a bolt. The center shaft 112 installs in the canister 111 such that the center axis of the center shaft 112 aligns with the center axis of the canister 111. The center shaft 112 forms the structure that attaches the cap 113 to the canister 111. The center shaft 112 further comprises an exterior screw thread 141. The exterior screw thread 131 is formed on the lateral face of the center shaft 112. The thread of the exterior screw thread 141 is sized such that the exterior screw thread 141 will screw into the attaching nut 152 of the cap 113. The center shaft 112 is not a structure that is strictly required. The cap 113 can rest directly on the canister 111

The cap 113 is a disk-shaped structure. The circle formed by the disk-shape of the cap 113 is geometrically identical to the circle formed at the canister 111 superior end 132 such that the cap 113 will enclose and seal the canister 111. The cap 113 screws onto the center shaft 112 to form a fluid impermeable seal between the canister 111 and the cap 113. The cap 113 comprises a covering disk 151, an attaching nut 152, and a gasket structure 153. The attaching nut 152 further comprises an interior screw thread 154. The covering disk 151 is further defined with an exterior surface 181 and an interior surface 182

The covering disk 151 forms the primary structure of the cap 113. The covering disk 151 is formed from a fluid impermeable material.

The attaching nut 152 is a commercially available nut. The attaching nut 152 is formed with a cylindrical cavity. The cylindrical cavity is further formed with the interior screw thread 154. The interior screw thread 154 of the attaching nut 152 is sized such that the exterior screw thread 141 of the center shaft 112 will screw into the interior screw thread 154 of the attaching nut 152. The attaching nut 152 attaches to the interior surface 182 of the covering disk 151.

The attaching nut 152 mounts in the apex of the covering disk 151 such that the center axis of the attaching nut 152 aligns with the center axis of the covering disk 151. When the center shaft 112 screws into the attaching nut 152, the center axes of the canister 111 and the cap 113 align to form a composite pyramid.

The gasket structure 153 is an elastomeric material applied to the perimeter of the disk of the covering disk 151. The gasket structure 153 forms a fluid impermeable seal between the covering disk 151 and the canister 111 when the cap 113 attaches to the canister 111.

Each of the plurality of exhaust vents 114 is a cylindrical bend. Each of the plurality of exhaust vents 114 is a pipe used to transport the repellent material 103 in a gas phase into the atmosphere. Each of the plurality of exhaust vents 114 mounts in the canister 111 lateral face 131 of the canister 111 such that the center axis of the bend of each of the canister 111 projects radially away from the center axis of the canister 111 before the cant formed in the bend routes the flow of the gas phase of the repellent material 103 towards the ground 192. The bend is defined in greater detail elsewhere in this disclosure.

The cant formed in the bend of each of the plurality of exhaust vents 114 inhibits the flow of liquid into the canister 111 through the plurality of exhaust vents 114. The bend of each of the plurality of exhaust vents 114 is selected from the group consisting of a 45-degree bend and a 90-degree bend.

The plurality of exhaust vents 114 further comprises a first exhaust vent 161, a second exhaust vent 162, a third exhaust vent 163, and a fourth exhaust vent 164.

The first exhaust vent 161 is a bend selected from the plurality of exhaust vents 114. The first exhaust vent 161 vents the gas phase of the repellent material 103 from the canister 111.

The second exhaust vent 162 is a bend selected from the plurality of exhaust vents 114. The second exhaust vent 162 vents the gas phase of the repellent material 103 from the canister 111. The second exhaust vent 162 is formed at the same elevation from the canister 111 inferior end 133 as the first exhaust vent 161. A radial angle of 90 degrees is formed between the radial axis of the first exhaust vent 161 and the radial axis of the second exhaust vent 162.

The third exhaust vent 163 is a bend selected from the plurality of exhaust vents 114. The third exhaust vent 163 vents the gas phase of the repellent material 103 from the canister 111. The third exhaust vent 163 is formed at the same elevation from the canister 111 inferior end 133 as the second exhaust vent 162 and the first exhaust vent 161. A radial angle of 90 degrees is formed between the radial axis of the second exhaust vent 162 and the radial axis of the third exhaust vent 163. A radial angle of 180 degrees is formed between the radial axis of the first exhaust vent 161 and the radial axis of the third exhaust vent 163.

The fourth exhaust vent 164 is a bend selected from the plurality of exhaust vents 114. The fourth exhaust vent 164 vents the gas phase of the repellent material 103 from the canister 111. The fourth exhaust vent 164 is formed at the same elevation from the canister 111 inferior end 133 as the third exhaust vent 163 and the second exhaust vent 162. A radial angle of 90 degrees is formed between the radial axis of the third exhaust vent 163 and the radial axis of the fourth exhaust vent 164. A radial angle of 180 degrees is formed between the radial axis of the second exhaust vent 162 and the radial axis of the fourth exhaust vent 164.

The anchor mount 115 is a capped cylindrical pipe. The anchor mount 115 attaches to the exterior side of the canister 111 lateral face 131. The anchor mount 115 mounts on the canister 111 such that the center axis of the anchor mount 115 is parallel to the center axis of the canister 111. The open end of the anchor mount 115 is the end of the anchor mount 115 that is proximal to the ground 192. The ground 192 anchor 102 inserts into the anchor mount 115 such that the dispenser 101 is held at an elevated position relative to the ground 192.

The ground 192 anchor 102 is a mechanical structure that secures the dispenser 101 to the ground 192. The ground 192 anchor 102 is a post that is driven into the ground 192 anchor 102 such that the dispenser 101 is held at an elevation above the ground 192. The ground 192 anchor 102 comprises a stanchion 121, a drive grip 122, and a working tip 123. The stanchion 121 is further defined with a stanchion 121 inferior end 171 and a stanchion 121 superior end 172. The stanchion 121 inferior end 171 is the end of the stanchion 121 that is driven into the ground 192. The stanchion 121 superior end 172 is the end of the stanchion 121 that is distal from the stanchion 121 inferior end 171.

The stanchion 121 forms an extension structure that elevates the canister 111 above the ground 192. The stanchion 121 is a cylindrical shaft structure. The outer diameter of the stanchion 121 is less than the inner diameter of the anchor mount 115 such that the stanchion 121 superior end 172 inserts into the open end of the anchor mount 115.

The drive grip 122 is a cylindrical shaft structure. The drive grip 122 attaches to the lateral face of the stanchion 121 such that the center axis of the drive grip 122 intersects perpendicularly with the center axis of the stanchion 121. The drive grip 122 forms a grip that allows a downward force to be applied to the ground 192 anchor 102 when driving the ground 192 anchor 102 into the ground 192.

The working tip 123 is the working end of the stanchion 121 as the stanchion 121 is driven into the ground 192. The working tip 123 is a pointed structure formed on the stanchion 121 inferior end 171. The working tip 123 is the element that leads the stanchion 121 as it is driven into the ground 192.

The repellent material 103 is a volatile chemical substance. When in the gas phase, the repellent material 103 creates an aroma that is repellent to the pest 191. The repellent material 103 is stored in a solid or liquid phase in the dispenser 101. The dispenser 101 then sublimates or evaporates (respectively) the repellent material 103 into a gas phase which escapes from the dispenser 101 into the atmosphere.

In the first potential embodiment of the disclosure, the repellent material 103 is selected from the group consisting of 1,4-dichlorobenzene (CAS 106-46-7), naphthalene (CAS 91-20-3), and an essential oil. Essential oils suitable for use as pest repellent include, but are not limited to, basil oil, cedarwood oil, citronella oil, chamomile oil, clove oil, lavender oil, lemongrass oil, oregano oil, peppermint oil, and thyme oil.

The following definitions were used in this disclosure:

1,4-dichlorobenzene: As used in this disclosure, 1,4-dichlorobenzene (CAS 106-46-7) is a benzene atom with two opposite hydrogen atoms replaced with chlorine atoms. The chemical formula for 1,4-dichlorobenzene is $C_6H_4Cl_2$.

45 Degree Bend: As used in this disclosure, a 45-degree bend refers to a pipe with a constant inner diameter that has a 45-degree cant formed in the center axis of the pipe at a location between the two ends of the pipe.

90 Degree Bend: As used in this disclosure, a 90-degree bend refers to a pipe with a constant inner diameter that has a 90-degree cant formed in the center axis of the pipe at a location between the two ends of the pipe.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Apex: As used in this disclosure, an apex is a vertex that forms an extreme or solitary point of an object.

Atmosphere: As used in this disclosure, the atmosphere refers to a blanket of gases (primarily nitrogen and oxygen) that surround the earth. Typical atmospheric conditions are approximated and characterized as the normal temperature and pressure.

Bend: As used in this disclosure, a bend refers to a pipe with a constant inner diameter that has a cant formed in the center axis of the pipe at a location between the two ends of the pipe.

Benzene: As used in this disclosure, benzene (CAS 71-43-2) as an aromatic organic compound that forms a ring. The chemical formula for benzene is $C_6H_6$.

Bolt: As used in this disclosure, a bolt is a cylindrical shaft that is formed with an exterior screw thread. A bolt is defined with an outer diameter.

Cant: As used in this disclosure, a cant is an angular deviation from one or more reference lines (or planes) such as a vertical line (or plane) or a horizontal line (or plane).

Capped Pipe: As used in this disclosure, a capped pipe is a pipe with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Check Valve: As used in this disclosure, a check valve is a valve that permits the flow of fluid or gas in a single direction. Within selected potential embodiments of this disclosure, the check valve is a commercially available product that is selected from the group consisting of a ball valve and a Tesla valve.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Correspond: As used in this disclosure, the term correspond is used as a comparison between two or more objects wherein one or more properties shared by the two or more objects match, agree, or align within acceptable manufacturing tolerances.

Cylinder: As used in this disclosure, a cylinder is a geometric structure defined by two identical flat and parallel ends, also commonly referred to as bases, which are circular in shape and connected with a single curved surface, referred to in this disclosure as the lateral face. The cross-section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Disk: As used in this disclosure, a disk is a prism-shaped object that is flat in appearance.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elevation: As used in this disclosure, elevation refers to the span of the distance between a horizontal surface and a supporting surface as measured in the direction opposite to the force of gravity.

Essential Oil: As used in this disclosure, an essential oil is a lipid-based solution that contains one or more volatile aroma compounds. Examples of essential oils include, but are not limited to, basil oil, black pepper oil, caraway oil, *cannabis* flower oil, cedarwood oil, cinnamon oil, citronella oil, chamomile oil, clove oil, davana oil, *eucalyptus* oil, frankincense oil, horseradish oil, jasmine oil, lavender oil, lemon oil, lemongrass oil, mandarin oil, nutmeg oil, orange oil, oregano oil, peppermint oil, pine oil, sage oil, sandalwood oil, star anise oil, and thyme oil. Basil oil, cedarwood oil, citronella oil, chamomile oil, clove oil, lavender oil, lemongrass oil, and peppermint oil are traditionally considered to have insect repellent properties. Oregano oil and thyme oil is traditionally considered to repel deer.

Evaporation: As used in this disclosure, evaporation refers to the phase transition of a compound from a liquid phase to a gas phase.

Exterior Screw Thread: An exterior screw thread is a ridge wrapped around the outer surface of a tube in the form of a helical structure that is used to convert rotational movement into linear movement.

Gasket: As used in this disclosure, a gasket is an elastomeric material that is placed between a first surface and a second surface for the purpose of: 1) creating a liquid or gas impermeable seal between the first surface and the second surface; or, 2) preventing the first surface from damaging the second surface (or vice versa).

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Ground: As used in this disclosure, the ground is a solid supporting surface formed by the Earth. The term level ground means that the supporting surface formed by the ground is roughly perpendicular to the force of gravity.

Inferior: As used in this disclosure, the term inferior refers to a directional reference that is parallel to and in the same direction as the force of gravity when an object is positioned or used normally.

Inner Diameter: As used in this disclosure, the term inner diameter is used in the same way that a plumber would refer to the inner diameter of a pipe.

Interior Screw Thread: An interior screw thread is a groove that is formed around the inner surface of a tube in the form of a helical structure that is used to convert rotational movement into linear movement.

Make Up Air: As used in this disclosure, make up air is air that permitted to enter an enclosed space to replace the air that has been evacuated in some manner, for example by a fan, from the enclosed space.

Naphthalene: As used in this disclosure, naphthalene (CAS 91-20-3) is an organic compound comprising two benzene rings conjoined across a single carbon bond. The chemical formula of naphthalene is $C_{10}H_8$.

Normal Temperature and Pressure: As used in this disclosure, normal temperature and pressure refer to atmospheric conditions corresponding to 20 degrees C. at 100 kPa (approx. 1 atmosphere). Normal temperature and pressure is often abbreviated as NTP. See standard temperature and pressure.

Nut: As used in this disclosure, a nut is a first object that is formed with a cylindrical negative space that further comprises an interior screw thread such that a second object with a matching exterior screw thread can screw into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Outer Diameter: As used in this disclosure, the term outer diameter is used in the same way that a plumber would refer to the outer diameter of a pipe.

Phase: As used in this disclosure, phase refers to the state of the form of matter. The common states of matter are solid, liquid, gas, and plasma.

Picket: As used in this disclosure, a picket is a prism-shaped shaft with a narrowing or point formed at one of the congruent ends of the prism.

Pipe: As used in this disclosure, a pipe is a hollow cylindrical device that is used for transporting liquids and gases. The line that connects the center of the first base of the cylinder to the center of the second base of the cylinder is referred to as the axis of the cylinder or the centerline of the pipe. When two pipes share the same centerline they are said to be aligned. In this disclosure, the terms inner diameter of a pipe and outer diameter are used as they would be used by those skilled in the plumbing arts.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pyramid: As used in this disclosure, a pyramid is a three-dimensional shape that comprises a base formed in the shape of an N-gon (wherein N is an integer) with N triangular faces that rise from the base to converge at a point above the base. If the point where the N faces meet is positioned such that a line drawn from the point where the N faces meet to the center of the N-gon base is perpendicular to the N-gon base, the pyramid is referred to as a right pyramid. Pyramids can be further formed with circular or elliptical bases which are commonly referred to as cone or an elliptical pyramid respectively. A pyramid is defined with a base, an apex, and a lateral face. The base is the N-gon shaped base described above. The apex is the convergence point described above. The lateral face is formed from the N triangular faces described above.

Radial: As used in this disclosure, the term radial refers to a direction that: 1) is perpendicular to an identified central axis; or, 2) projects away from a center point.

Repellent: As used in this disclosure, a repellent is a chemical substance that is used to repel animals away from an object or location.

Ring: As used in this disclosure, a ring is term that is used to describe a flat or plate-like structure through which an aperture is formed. Rings are often considered loops.

Screw: As used in this disclosure, to screw is a verb meaning: 1) to fasten or unfasten (unscrew) a threaded connection; or 2) to attach a helical structure to a solid structure.

Stake: As used in this disclosure, a stake is a shaft that is driven into a horizontal surface, such as the ground, to serve as an anchor point.

Stanchion: As used in this disclosure, a stanchion refers to a vertical pole, post, or support. See beam and gusset and strut.

Sublimation: As used in this disclosure, sublimation refers to a phase transition directly from a solid phase to a gas phase in a manner that bypasses the liquid phase.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Tesla Valve: As used in this disclosure, a Tesla valve is a type of check valve that requires the use of no moving parts.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

Truncated: As used in this disclosure, a geometric object is truncated when an apex, vertex, or end is cut off by a line or plane.

Volatile: As used in this disclosure, volatile refers to a substance that will evaporate or sublimate into a gas state at normal temperature and pressure.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An olfactory device comprising
a dispenser, a ground anchor, and a repellent material;
wherein the dispenser contains the repellent material in a phase selected from the group consisting of a liquid phase and a solid phase;
wherein the dispenser releases the repellent material in a gas phase into the atmosphere;
wherein the ground anchor anchors the dispenser to the ground such that the dispenser is elevated above the ground;
wherein the olfactory device is a chemical dispenser;
wherein the olfactory device is configured for use in driving away a pest;
wherein the olfactory device stores and dispenses the repellent material, which is configured to repel said pest;
wherein the olfactory device dispenses the repellent material in a gas phase;
wherein the olfactory device contains the repellent material in a water impermeable structure;
wherein the dispenser comprises a canister, a center shaft, a cap, a plurality of exhaust vents, and an anchor mount;
wherein the cap, the plurality of exhaust vents and the anchor mount attach to the canister;

wherein the ground anchor secures the dispenser to the ground;
wherein the ground anchor is driven into the ground such that the dispenser is held at an elevation above the ground;
wherein the repellent material is a volatile chemical substance;
wherein the gas phase of the repellent material creates an aroma that is repellent to the pest;
wherein the repellent material is stored in the dispenser in a phase selected from the group consisting of a solid phase and a liquid phase;
wherein the dispenser releases the repellent material as a gas phase into the atmosphere;
wherein the ground anchor comprises a stanchion, a drive grip, and a working tip;
wherein the stanchion is further defined with a stanchion inferior end and a stanchion superior end;
wherein the stanchion inferior end is driven into the ground;
wherein the stanchion superior end is distal from the stanchion inferior end;
wherein the stanchion forms an extension structure that elevates the canister above the ground;
wherein the stanchion is a cylindrical shaft structure;
wherein the drive grip is a cylindrical shaft structure;
wherein the drive grip attaches to the lateral face of the stanchion such that the center axis of the drive grip intersects perpendicularly with the center axis of the stanchion;
wherein the working tip is driven into the ground;
wherein the working tip is a pointed structure formed on the stanchion inferior end;
wherein the working tip leads the stanchion driven into the ground;
wherein the canister is a fluid impermeable container;
wherein the canister has a cylindrical shape;
wherein the canister is a capped pipe;
wherein the canister forms a physical shell that contains the repellent material;
wherein the canister further comprises a canister lateral face, a canister superior end, and a canister inferior end;
wherein the canister lateral face is a lateral face of the cylindrical structure formed by the canister;
wherein the canister superior end is an open end of the capped pipe structure of the canister;
wherein access into a hollow interior of the canister is through the canister superior end;
wherein the canister inferior end is a closed end of the canister;
wherein the canister inferior end further comprises a make-up vent;
wherein the make-up vent is a check valve;
wherein the center shaft is a cylindrical shaft structure;
wherein the center shaft installs in the canister such that the center axis of the center shaft aligns with the center axis of the canister;
wherein the center shaft attaches the cap to the canister;
wherein the center shaft further comprises an exterior screw thread;
wherein the exterior screw thread is formed on the lateral face of the center shaft;
wherein the cap is a disk-shaped structure;
wherein the cap screws onto the center shaft;
wherein the cap comprises a covering disk, an attaching nut, and a gasket structure;
wherein the gasket and the attaching nut attach to the covering disk;
wherein the attaching nut attaches to the covering disk;
wherein the plurality of exhaust vents further comprises a first exhaust vent, a second exhaust vent, a third exhaust vent, and a fourth exhaust vent;
wherein the first exhaust vent is a bend selected from the plurality of exhaust vents;
wherein the second exhaust vent is a bend selected from the plurality of exhaust vents;
wherein the second exhaust vent is formed at the same elevation from the canister inferior end as the first exhaust vent;
wherein the third exhaust vent is a bend selected from the plurality of exhaust vents;
wherein the third exhaust vent is formed at the same elevation from the canister inferior end as the second exhaust vent and the first exhaust vent;
wherein the fourth exhaust vent is a bend selected from the plurality of exhaust vents;
wherein the fourth exhaust vent is formed at the same elevation from the canister inferior end as the third exhaust vent and the second exhaust vent;
wherein the covering disk is further defined with an exterior surface and an interior surface;
wherein the covering disk forms a barrier structure of the cap;
wherein the covering disk is formed from a fluid impermeable material;
wherein the attaching nut is a nut;
wherein the attaching nut is formed with a cylindrical cavity;
wherein the cylindrical cavity is further formed with an interior screw thread;
wherein the interior screw thread of the attaching nut is sized such that the exterior screw thread of the center shaft will screw into the interior screw thread of the attaching nut;
wherein the attaching nut mounts in the apex of the covering disk such that the center axis of the attaching nut aligns with the center axis of the covering disk;
wherein when the center shaft screws into the attaching nut, the center axes of the canister and the cap align to form a composite pyramid;
wherein the gasket structure is an elastomeric material applied to the perimeter of the circle formed by the covering disk;
wherein the gasket structure forms a fluid impermeable seal between the covering disk and the canister when the cap attaches to the canister;
wherein each of the plurality of exhaust vents is a cylindrical bend;
wherein each of the plurality of exhaust vents transports the repellent material in a gas phase into the atmosphere;
wherein each of the plurality of exhaust vents mounts in the lateral face of the canister;
wherein a cant formed in the bend of each of the plurality of exhaust vents inhibits the flow of liquid into the canister through the plurality of exhaust vents;
wherein the bend of each of the plurality of exhaust vents is selected from the group consisting of a 45-degree bend and a 90-degree bend;
wherein the anchor mount is a capped cylindrical pipe;
wherein the anchor mount attaches to the exterior side of the canister lateral face;

wherein the anchor mount mounts on the canister such that the center axis of the anchor mount is parallel to the center axis of the canister;

wherein the ground anchor inserts into the anchor mount such that the dispenser is held at an elevated position relative to the ground;

wherein the outer diameter of the stanchion is less than the inner diameter of the anchor mount such that the stanchion superior end inserts into the open end of the anchor mount;

wherein the make-up vent allows make up air to enter the canister to replace the gas vapor of the repellent material lost through the plurality of exhaust vents;

wherein the make-up vent prevents any repellent material that is in a liquid phase from escaping from the canister;

wherein the make-up vent is mounted in the canister inferior end such that precipitation does not enter the canister through the make-up vent.

\* \* \* \* \*